March 1, 1960
V. LOMBARDO ET AL
2,926,387
CLAMPING DEVICES
Filed Nov. 30, 1956
2 Sheets-Sheet 1
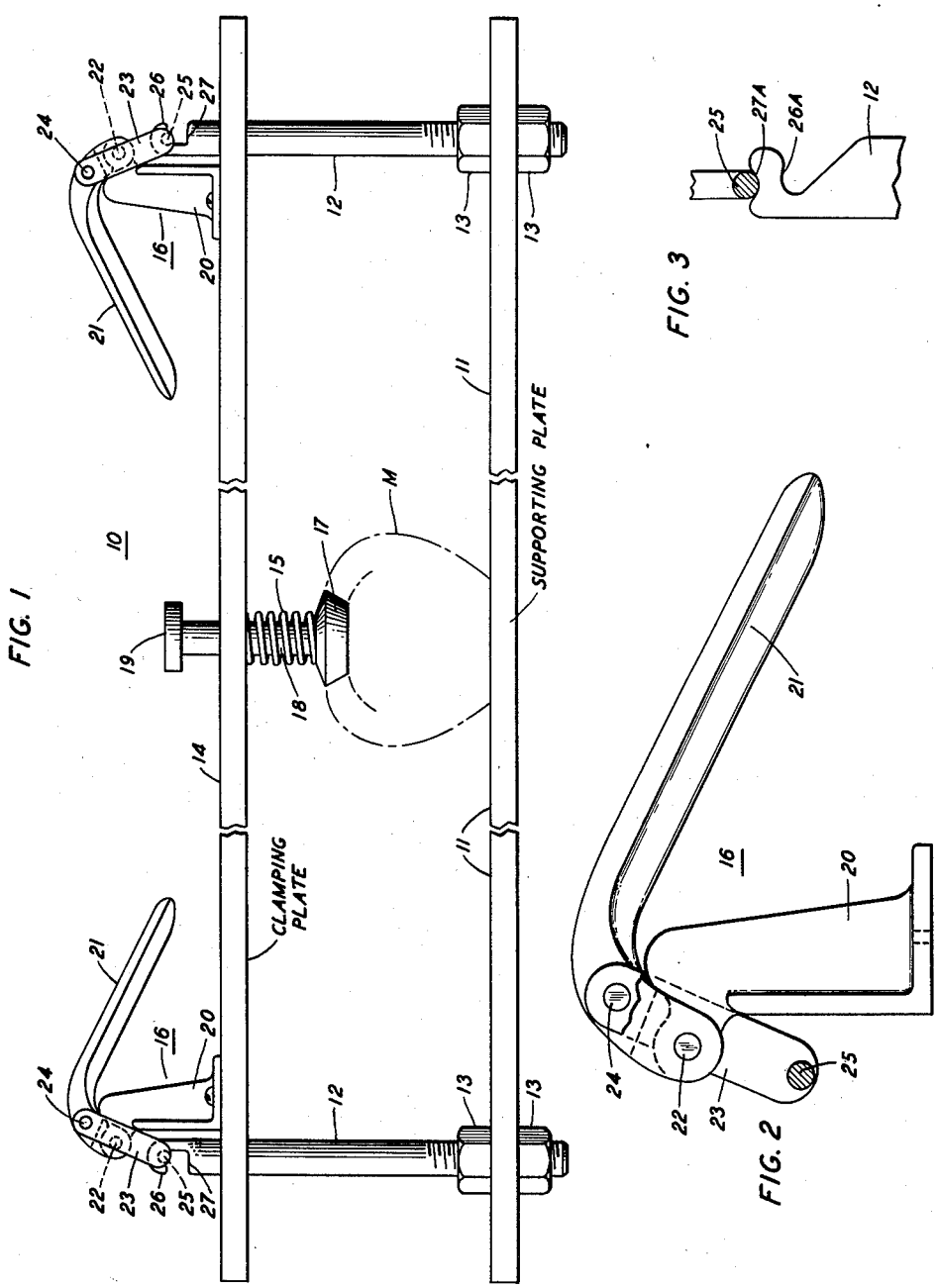
INVENTORS: LOUIS NEWFIELD
VINCENT LOMBARDO
BY
Hugh S. Wertz
ATTORNEY

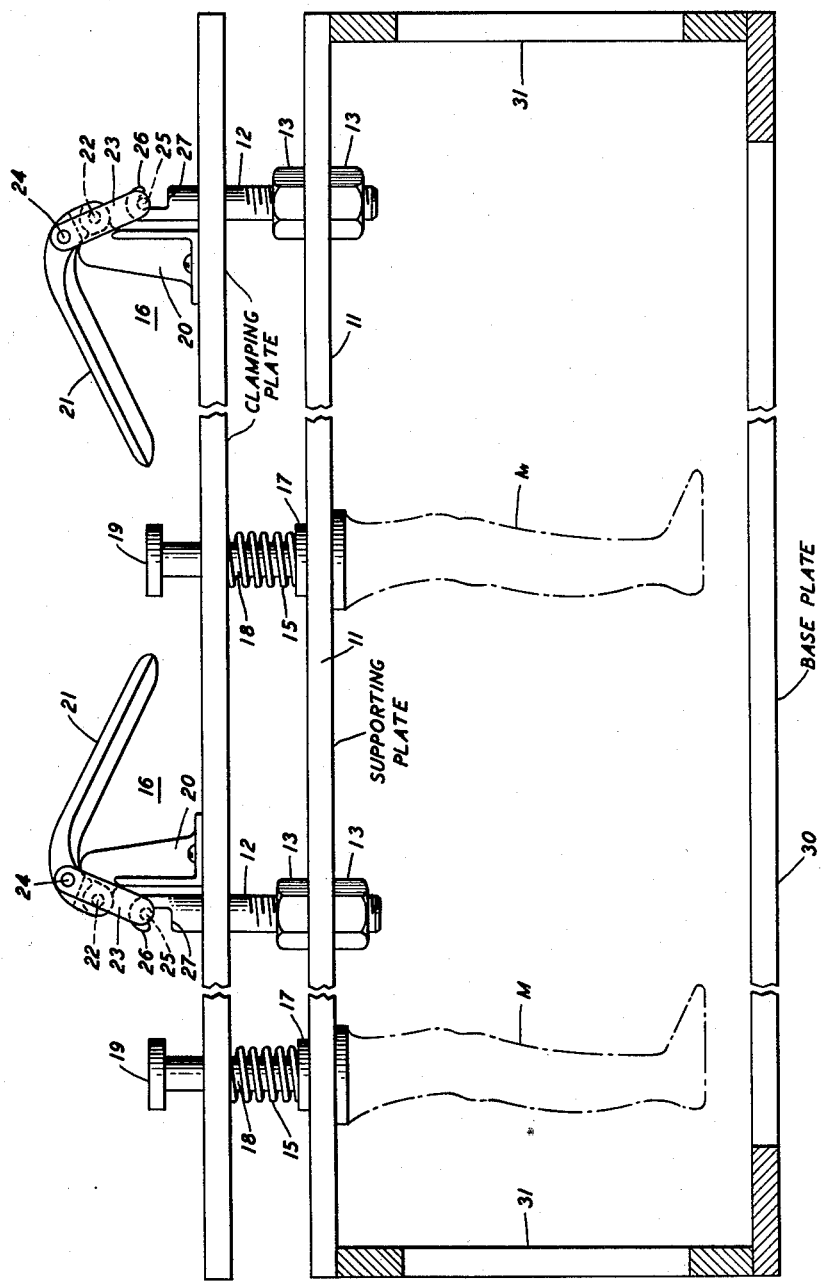

United States Patent Office 2,926,387
Patented Mar. 1, 1960

2,926,387

CLAMPING DEVICES

Vincent Lombardo, Brooklyn, and Louis Newfield, Rego Park, N.Y., assignors to Perfect Doll Moulds Co. Inc., New York, N.Y., a corporation of New York Application November 30, 1956, Serial No. 625,464

1 Claim. (Cl. 18—43)

This invention relates to clamping devices and, more specifically, to clamping means used to secure one part of a mould-holding structure to other parts thereof.

In one type of centrifugal casting, one or more moulds are customarily held in place within a supporting structure which is rotated at high speeds. After a suitable length of time (sufficient to cause the plastic material to assume the shape of the mould), the rotation is stopped and the mould is released from its supporting structure.

In a specific form of supporting structure used, for example, in connection with the moulding of heads or other portions of dolls, a mould-supporting plate is used to hold in place a plurality of moulds into which a prescribed amount of plastic is poured. Then a clamping plate separated by resilient means from the covers of the moulds is put in place and forced down by suitable clamps. The clamps used in the past have all had one or more of the following disadvantages: (1) they have not had a positive-enough locking action, that is, they have been easily released by jars, (2) after the rotation process, it has sometimes been difficult to release the clamping plate due to the stickiness of the plastic material, and (3) the clamps have been of the type conductive to bruised knuckles produced in the act of setting or releasing the clamps.

It is an object of the present invention to provide a clamping means for moulds of the type described above which does not have the above-described disadvantages.

It is another object of this invention to provide a clamping means for moulds which has both positive closing and opening movements.

The above and related objects are attained in accordance with the invention by providing a mould-holding structure in which a plurality of novel clamps, fixedly mounted on a movable clamping plate, compress a plurality of springs placed between the covers of the moulds and the clamping plate and thus hold the covers tightly in the mouths of the moulds. Each clamp comprises a base member from which a curved handle is pivoted and which handle has pivoted from an intermediate portion thereof a linkage member terminating in a cross-pin which has a dual purpose. The cross-pin is positioned to engage a hook on the end of a stationary tie rod fixedly attached to the supporting plate and projecting through the clamping plate. By pressing down on the handle, the clamping plate is moved downwardly with respect to the hook and, after the handle has passed a predetermined point in its travel, the handle is locked into position and it will not release of its own accord. In opening the clamp, after the handle is raised to a sufficient point, the cross-pin presses against a contact portion of the tie rod (under the hook) and the clamping plate is raised with respect to the hook. Thus there are both positive locking and unlocking movements.

The invention will be more readily understood by referring to the following description taken in connection with the accompanying drawings forming a part thereof, in which:

Fig. 1 is an elevation view of a moulding structure showing improved clamping means in accordance with the invention;

Fig. 2 is an enlarged elevation view, with portions broken away, of one of the cover clamps of the arrangement of Fig. 1;

Fig. 3 is a fragmentary view of a modification of the clamping means of Fig. 1; and Fig. 4 is an elevation view of a modification of the arrangement of Fig. 1.

Referring more specifically to the drawings, Fig. 1 shows, by way of example for purposes of illustration, a moulding device 10 employing an improved clamping means in accordance with the invention. While the clamping means may have a variety of forms and be employed in any one of a number of different devices, it has been shown in Fig. 1 in the form of a cover clamp for a doll mould.

The moulding device 10 comprises a supporting plate 11 on which one or more moulds M is held in position, a plurality of tie rods 12 fastened to the plate 11 by any suitable means such as by nuts 13, a movable clamping plate 14 through which the rods 12 project, spring means 15 for supporting the plate 14 from the mould M, and a plurality of clamps 16 mounted on the clamping plate 14 and which fasten to the tie rods 12.

In assembling the moulding structure 10, the moulds M are placed on the supporting plate 11 and the covers 17, which are attached to rods 18 which project through holes in the clamping plate 14 and which may have heads 19 on them, are pushed into the heads of the moulds M. The clamps 16, which are important features of this invention, are then operated to close the moulding device.

Each clamp 16 comprises a base member 20 which is fastened to the clamping plate, a curved handle 21 pivoted to the member 20 at the pivot point 22, and a linkage member 23 pivoted from an intermediate point 24 in the handle and having a cross-pin 25 at or near the end thereof. The cross-pin is adapted to catch under hook 26 at the upper part of tie rod 12 when the clamp 16 is to be closed and to push against contact portion 27 of the tie rod 12 when the clamp is to be opened.

In closing the moulding device 10, each handle 21 is put in the raised position and the corresponding cross-pin 25 is placed under the hook 26. The handles 21 are then lowered and the pins 25 pull up, causing the base 20 and hence the clamping plate 20 to be pushed tightly against each spring 15 around its rod 18 and force each cover 17 tightly into the mouth of the corresponding mould M. Due to the curvature of the handle 21 and the position of the pivot point 22, the handle 21 will stay locked in its lowermost position, thus locking the clamping plate tightly in place.

When it is desired to open the moulding device 10, each handle 21 is raised and, when it has reached a certain position, the corresponding cross-pin 25 is pushed against the contact portion 27 of the tie rod and this gives enough leverage to loosen the clamping plate 14. This is an important feature of this invention as the plastic material used in the mould frequently seals the clamping plate to other parts of the moulding device 10. Completing the upward movement of the handle 21 will open the device 10 as the clamping plate 14 will be raised with respect to the tie rod.

It will thus be clear that the clamping device 16 makes possible a positive closing movement, with the handle locked-in when fully closed, and a positive opening movement—without danger to the hands of the user.

Fig. 3 shows a modified form of tie rod 12. The hook 26A is similar to the hook 26 of the rod 12 in Fig. 1 but the contact portion 27A of the tie rod is on top of the rod instead of being under the hook. Thus in opening the moulding device 10, the handle 21 is raised until the pin 25 can be placed on top of the rod 12, in the position shown in Fig. 3, and the handle is then allowed to continue its movement, forcing the pin 25 downwardly against the contact portion 27A. This opens the device 10 as in the case of the arrangement of Fig. 1.

Fig. 4 shows another modification of the arrangement of Fig. 1, corresponding parts in the two figures being assigned the same reference characters. In Fig. 4 the tops of the moulds M are fastened to the supporting plate 11 and hang therefrom. A base plate or frame 30 and a plurality of vertical frame members 31 can be used to support the plate 11. Otherwise, the two structures (of Figs. 1 and 4) are identical, as are the operations thereof.

Obviously, various other changes can be made in the embodiments described above without departing from the spirit of the invention, as indicated in the claim.

What is claimed is:

In combination, a mould-supporting plate, a cover for the mould, a movable clamping plate separated from said mould cover by resilient means, a stationary tie rod attached to said mould-supporting plate and projecting above said clamping plate, said tie rod having a hook at one end thereof with its open end facing the side of the rod and providing a first contact portion, for an upward thrust, on the inside of the hook, said tie rod also having a second contact portion, for a downward thrust, which is vertically displaced from said first contact portion, and a clamp member for forcing the clamping plate towards the supporting plate against the action of said resilient means when it is desired to hold the mould cover in position and for positively moving said clamping plate in the opposite direction when it is desired to release said mould cover, said clamp member comprising a base firmly attached to said clamping plate, a curved handle pivoted at one of its ends from said base, and a linkage member pivoted at one end from an intermediate point of said handle and having a cross-pin at its opposite end to provide, when the cross-pin is caught under the hook on the tie rod and in contact with said first contact portion, and the handle is moved in the cover-closing direction, a strong, positive, upward force against the first contact portion to move the clamping plate toward the supporting plate, and also, when the cross-pin is firmly positioned against said second contact portion of the tie rod and the handle moved in the cover-opening direction, a strong, positive, downward force to move the clamping plate in the direction away from the supporting plate.

References Cited in the file of this patent

UNITED STATES PATENTS

| | | |
|---|---|---|
| 1,311,560 | Horsey | July 29, 1919 |
| 1,511,810 | Gwynn | Oct. 14, 1924 |
| 2,228,316 | James | Jan. 14, 1941 |
| 2,298,057 | Kelm | Oct. 6, 1942 |
| 2,519,984 | Speaker | Aug. 22, 1950 |
| 2,574,281 | Olson | Nov. 6, 1951 |
| 2,624,072 | Delacoste et al. | Jan. 6, 1953 |
| 2,740,159 | Berg | Apr. 3, 1956 |

FOREIGN PATENTS

| | | |
|---|---|---|
| 460,291 | Italy | Nov. 13, 1950 |